United States Patent [19]

McLaughlin et al.

[11] Patent Number: 5,513,539
[45] Date of Patent: May 7, 1996

[54] APPARATUS AND METHOD FOR DETERMINING THE BEST POSITION FOR INNER AND OUTER MEMBERS IN A ROTARY MACHINE

[75] Inventors: Bryan P. McLaughlin; Douglas W. Vanner, both of Calgary, Canada

[73] Assignee: Transalta Utilities Corporation, Calgary, Canada

[21] Appl. No.: 268,779

[22] Filed: Jun. 30, 1994

[51] Int. Cl.⁶ .................................................. G01R 27/26
[52] U.S. Cl. ..................... 73/865.9; 324/662; 324/661; 340/870.37
[58] Field of Search .................. 324/207.25, 207.26, 324/661, 662, 663, 671; 340/870.37; 73/865.9

[56] References Cited

U.S. PATENT DOCUMENTS

| | | | |
|---|---|---|---|
| 3,628,136 | 12/1971 | Jonas . | |
| 3,743,934 | 7/1973 | Risch . | |
| 3,815,020 | 6/1974 | Mayer . | |
| 3,852,662 | 12/1974 | Katz . | |
| 3,981,621 | 9/1976 | Considine . | |
| 4,063,167 | 12/1977 | Duly . | |
| 4,071,820 | 1/1978 | Mushinsky | 324/662 |
| 4,199,718 | 4/1980 | Ikeda et al. . | |
| 4,675,670 | 6/1987 | Lalonde et al. | 324/662 |
| 4,704,906 | 11/1987 | Churchill et al. . | |
| 4,804,905 | 2/1989 | Ding et al. | 324/662 |
| 4,924,180 | 5/1990 | Nasr et al. . | |
| 5,101,165 | 3/1992 | Rickards | 324/662 |
| 5,107,195 | 4/1992 | Lyons et al. . | |

FOREIGN PATENT DOCUMENTS 65625  12/1982  European Pat. Off. ......... 340/870.37

Primary Examiner—Hezron E. Williams
Assistant Examiner—Daniel S. Larkin
Attorney, Agent, or Firm—Leydig, Voit & Mayer, Ltd.

[57] ABSTRACT

A method of determining the best position for an inner member relative to an outer member within a rotary machine requires the inner and outer members to be rotated relative to one another. The spacing between the inner and outer members at at least one location along the length of the rotary machine is detected generally continuously over at least one complete revolution. The detected spacing is then processed to determine the best position for the inner member relative to the outer member. An apparatus for carrying out the method is also disclosed.

26 Claims, 6 Drawing Sheets

FIG. 5A

| READING | STATOR SENSORS 116 | | | ROTOR SENSORS 114 | | |
|---|---|---|---|---|---|---|
| | COLUMN A | COLUMN B | COLUMN C | COLUMN D | COLUMN E | COLUMN F |
| 1 | x | x | x | y | y | y |
| 2 | x | x | x | y | y | y |
| 3 | x | x | x | y | y | y |
| 4 | x | x | x | y | y | y |
| . | . | . | . | . | . | . |
| . | . | . | . | . | . | . |
| . | . | . | . | . | . | . |
| . | . | . | . | . | . | . |
| . | . | . | . | . | . | . |
| n | x | x | x | y | y | y |

FIG. 5B

| READING | COLUMN G (A+B+C)/3 | COLUMN H (D+E+F)/3 | COLUMN I MINIMUM G AND ASSIGNED POLE | COLUMN J MINIMUM H AND ASSIGNED POSITION NUMBER | COLUMN K J + CONSTANT |
|---|---|---|---|---|---|
| 1 | x | y | x-1 | y-1 | z-1 |
| 2 | x | y | x-2 | y-2 | z-2 |
| 3 | x | y | x-3 | y-3 | z-3 |
| 4 | x | y | x-4 | y-4 | z-4 |
| . | . | . | . | . | . |
| . | . | . | . | . | . |
| . | . | . | . | . | . |
| n | x | y | x-k | y-k | z-k |

5,513,539

APPARATUS AND METHOD FOR DETERMINING THE BEST POSITION FOR INNER AND OUTER MEMBERS IN A ROTARY MACHINE

FIELD OF THE INVENTION

The present invention relates generally to rotary machines and in particular, to an apparatus and method of determining the best position for an inner member relative to an outer member within a rotary machine such as for example, the rotor and stator in an electric machine.

BACKGROUND OF THE INVENTION

Rotary machines and in particular electric machines, are well known in the art. In the case of electric machines (both generators and motors), the electric machine includes a stator and a rotor separated by an air gap. The rotor is positioned within the stator and is rotatably mounted on the casing of the electric machine via bearings. For optimum performance of the electric machine, it is desired that the air gap between the rotor and the stator be constant about the entire circumference of the rotor. This ensures a constant magnetic flux between the rotor and stator during operation of the electric machine.

When the shape of both the rotor and stator are exact, if the rotor is positioned within the stator so that its physical, central longitudinal axis is coincident with the physical, central longitudinal axis of the stator, the air gap between the rotor and stator will be constant. Unfortunately, during the manufacturing process, it is rare for the shape of both the rotor and stator to be exact. This deviation in shape between the rotor and stator is especially pronounced in larger equipment. When such a deviation in shape exists, assembly of the electric machine to achieve optimum performance is not a simple task. This is in view of the fact that if the rotor is positioned within the stator with its physical, central longitudinal axis coincident with that of the stator, the air gap between the rotor and stator will not be constant thereby reducing the performance of the electric machine. In cases such as this, it is necessary for the position of the rotor relative to the stator to be adjusted to try to create a constant air gap between the rotor and stator. Thus, the physical, central longitudinal axis of the rotor will not be coincident with that of the stator.

In almost all instances, due to deviations in the physical shape of the rotor and stator, it is not possible to position the rotor so that a constant air gap between the rotor and stator exists. In these instances, it is desired that the rotor be located relative to the stator at the "best position" i.e. a position where the air gap between the rotor and stator is as close to constant as is possible. This allows the performance of the electric machine to be optimized within the constraints imposed by the physical shape of the rotor and stator.

In the past, the best position for the rotor within the stator has been determined manually. Specifically, when the rotor is positioned within the stator, the best position for the rotor is determined by measuring the air gap between a pole of the rotor and a section of the stator manually with feeler gauges. Measurements are taken at both ends of the rotor pole and are recorded. The rotor is then rotated by one pole face and the air gap between the ends of the next rotor pole and the same section of the stator is measured and recorded. This process is continued until the rotor has been rotated through one complete rotation. Once this has been done, the recorded measurements are averaged and plotted manually on a polar chart to determine the best position for the rotor within the stator. The position of the rotor or stator is then adjusted accordingly.

Unfortunately, this method of determining the best position for the rotor suffers from disadvantages. Specifically, because the rotor may include more than 56 poles, this method is extremely tedious, highly labour intensive and time consuming, often requiring up to 36 hours or more per electric machine. Also, in the case of large electric machines, due to the mass of the rotor, it is difficult to stop and start the rotation of the rotor so that it only rotates one pole face at a time. Further, when the measurements are being taken with the feeler gauges, the individuals taking the measurements must extend an arm between the rotor and stator and adjust the feeler gauge to contact the rotor and stator. Practically, this is difficult to do, often making the measured readings from the feeler gauges inaccurate.

Methods of dynamically monitoring the clearance between rotating components have been considered. For example, U.S. Pat. No. 3,628,136 to Jonas and U.S. Pat. No. 4,063,167 to Duly both show an apparatus permanently installed in a turbine for measuring the clearance between the shroud and the tips of the turbine blades. The apparatus includes an electric circuit connected to the shroud which measures the capacitance between itself and the tips of the turbine blades as the blades pass by the electric circuit. Since the magnitude of the measured capacitance depends upon the relative spacing between the electric circuit and the tips of the turbine blades, the clearance between the shroud and turbine blades can be determined by observing the output of the electric circuit. Thus, situations where the turbine blades are spaced too far from the shroud, which may result in back flow through the turbine, can be detected.

Although, the Jonas and Duly patents teach the electrical measurement of the clearance between a shroud and turbine blades, neither reference discloses a method for determining the best position for a rotor within a stator to optimize the performance of a rotary machine.

It is therefore an object of the present invention to provide a novel apparatus and method of determining the best position for an inner member within an outer member in a rotary machine.

SUMMARY OF THE INVENTION

According to one aspect of the present invention, there is provided a method of determining the best position for an inner member relative to an outer member within a rotary machine comprising the steps of:

(a) rotating the inner and outer members relative to one another;

(b) detecting the spacing between said inner and outer members at at least one location along one of the inner and outer members, generally continuously over at least one complete rotation; and (c) processing the detected spacing between said inner and outer members and determining therefrom, a best position for said inner member relative to said outer member.

Preferably, at step (b), the spacing between the inner and outer members is detected at a plurality of locations along the length of one of the inner and outer members and more preferably, at a plurality of locations along the length of both the inner and outer members. In this case, it is preferred that the spacing between the inner and outer members is detected near the ends and middle of both the inner and outer members.

Preferably, the method further includes the step of generating a physical representation of the best position for the inner member relative to the outer member. The physical representation can be presented via the monitor of a computer, a printer and/or a chart recorder.

In one embodiment, at step (b), the spacing between the inner and outer members is detected by capacitive sensors, the capacitive sensors being positioned at spaced locations along both the inner and outer members. Preferably, the capacitive sensors on the inner member form parallel plate capacitors with an adjacent section of the outer member, with the spacing therebetween constituting the dielectric of the capacitors. Likewise, the capacitive sensors on the outer member form parallel plate capacitors with an adjacent section of the inner member, with the spacing therebetween constituting the dielectric of the capacitors. The capacitive sensors generate output signals which vary as a function of the spacing between the sensors and the adjacent section of the respective inner and outer member. This allows a profile of the outer member to be generated from the output signals of the sensors on the inner member and allows a profile of the inner member to be generated from the output signals of the sensors on the outer member.

According to another aspect of the present invention there is provided an apparatus for determining the best position for an inner member relative to an outer member within a rotary machine, said apparatus comprising:

at least one sensor to detect the spacing between said inner and outer members at at least one location along one of the inner and outer members, generally continuously over at least one complete rotation of one of said inner and outer members; and a processor to process the detected spacing between said inner and outer members and determine therefrom, a best position for said inner member relative to said outer member.

The present invention provides advantages in that the best position for an inner member relative to an outer member can be determined without having to stop the relative rotation of the two members so that spacing measurements between the two members can be taken. This significantly reduces the time taken to determine the best position for the inner member relative to the outer member. Also, the present invention allow profiles of the inner and outer members to be generated.

BRIEF DESCRIPTION OF THE DRAWINGS

An embodiment of the present invention will now be described more fully with reference to the accompanying drawings, in which:

FIGS. 5a and 5b show a spreadsheet generated by the apparatus illustrated in FIG. 3.

DESCRIPTION OF THE PREFERRED EMBODIMENT

The present invention provides a method and apparatus of determining the best position for inner and outer members within a rotary machine. Within the context of the present invention, the term "rotary machine" refers to any machine having inner and outer components which rotate relative to one another and where the relative spacing between the two components is important for the rotary machine to operate optimally. Such rotary machines for example include electric motors and generators, draft tubes in which turbines are located and the like. An embodiment of the present invention will now be described with particular reference to an electric machine.

Figures 1, 2:
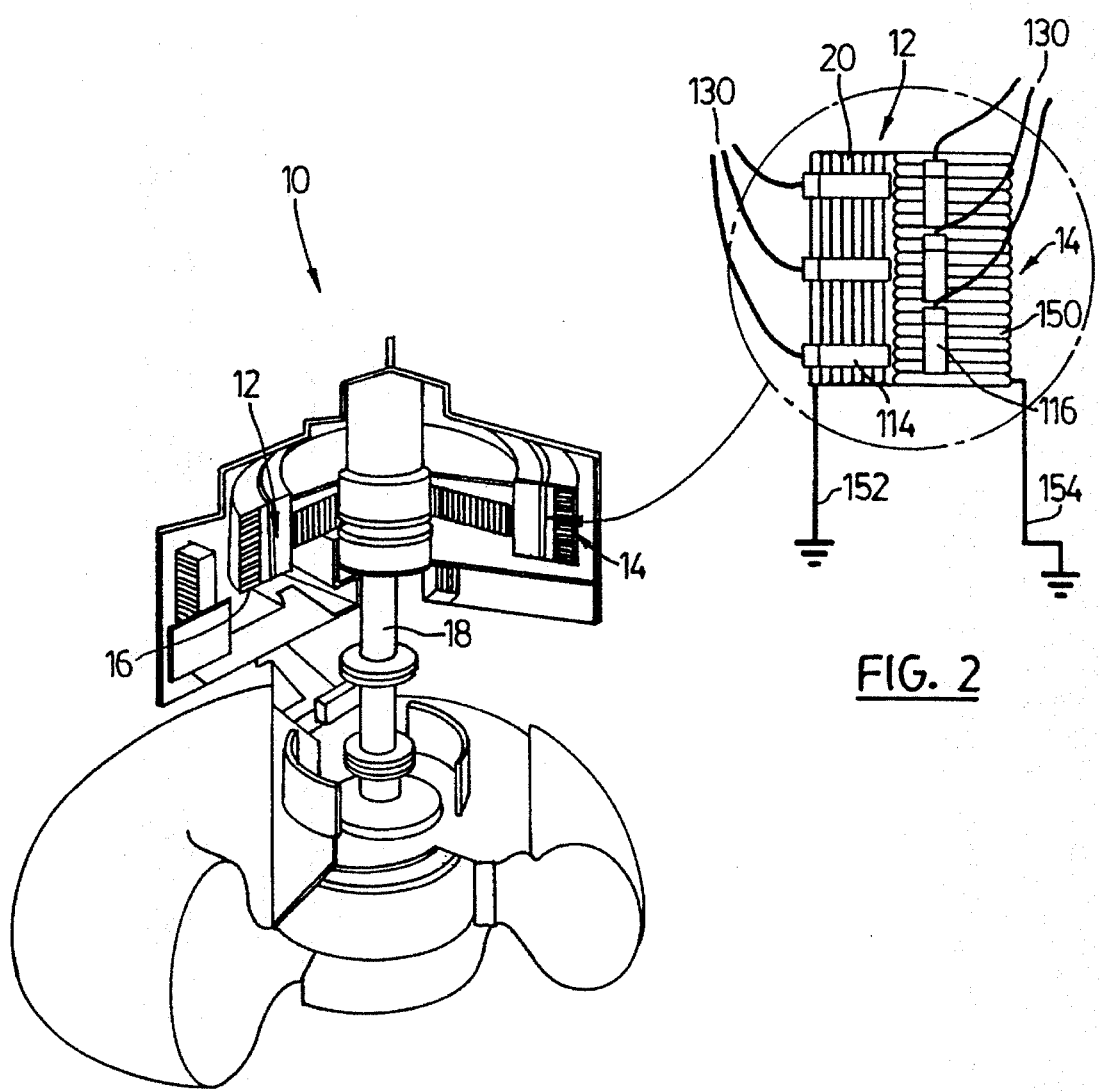
FIG. 1 is a perspective view, partially in section, of a generator illustrating the relative arrangement of the stator and the rotor.
FIG. 2 is an enlarged view of a portion of the generator, illustrated in FIG. 1, showing the location of the capacitive sensors in relation to the stator and the rotor.

Referring now to FIGS. 1 and 2, an electric machine in the form of a synchronous, hydro-electric generator is shown and is generally indicated by reference numeral 10. The generator 10 includes a rotor 12 positioned within a stator 14, the rotor and stator being separated by an air gap 16. The rotor 12 includes a shaft 18 mounted on the casing of the generator 10 by way of bearings (not shown) to facilitate rotation of the rotor 12. The rotor 12 has a plurality of poles extending radially outward from the shaft 18, one pole 20 of which is clearly shown in FIG. 2. A field winding (not shown) is located within the slots defined by the spacing between adjacent rotor poles 20. Associated with the stator 14 are three stator windings (not shown), phase-displaced by 120 electrical degrees in space.

Under normal operating conditions, the rotor 12 of the generator 10 is driven by a prime mover and the field winding is excited by a field current. As the rotor 12 turns, a varying flux wave between the field winding and the stator windings is created in the air gap 16 which in turn induces a voltage in the stator windings. The polarity of the induced voltage in the stator windings creates a flux wave in the air gap 16 which reacts with the flux wave created by the field current in the field winding. The two flux waves create an electromagnetic torque resulting from the tendency of the flux waves to align themselves. The electromagnetic torque opposes rotation of the rotor 12 and this is why the mechanical torque must be applied to the rotor 12 via the prime mover in order to sustain rotation of the rotor 12. The electromagnetic torque is the mechanism through which the generator 10 converts mechanical energy into electrical energy.

When the air gap 16 between the rotor 12 and the stator 14 is constant, the flux waves in the air gap are also constant. Therefore, the resultant voltage induced in the stator windings is constant. This is the desired and optimum manner in which the generator 10 is to operate. As mentioned previously, due to deviations in the physical shape of both the stator 14 and the rotor 12, it is often necessary to determine a best position for the rotor 12 which results in an air gap 16 that is as close to constant as is possible so that the generator 10 produces an output voltage on its stator windings which is as constant as is possible. It is also desired to maintain a constant air gap to avoid dynamic imbalances and unequal mechanical forces which may result in deformation of the stator and/or rotor.

Figure 3:
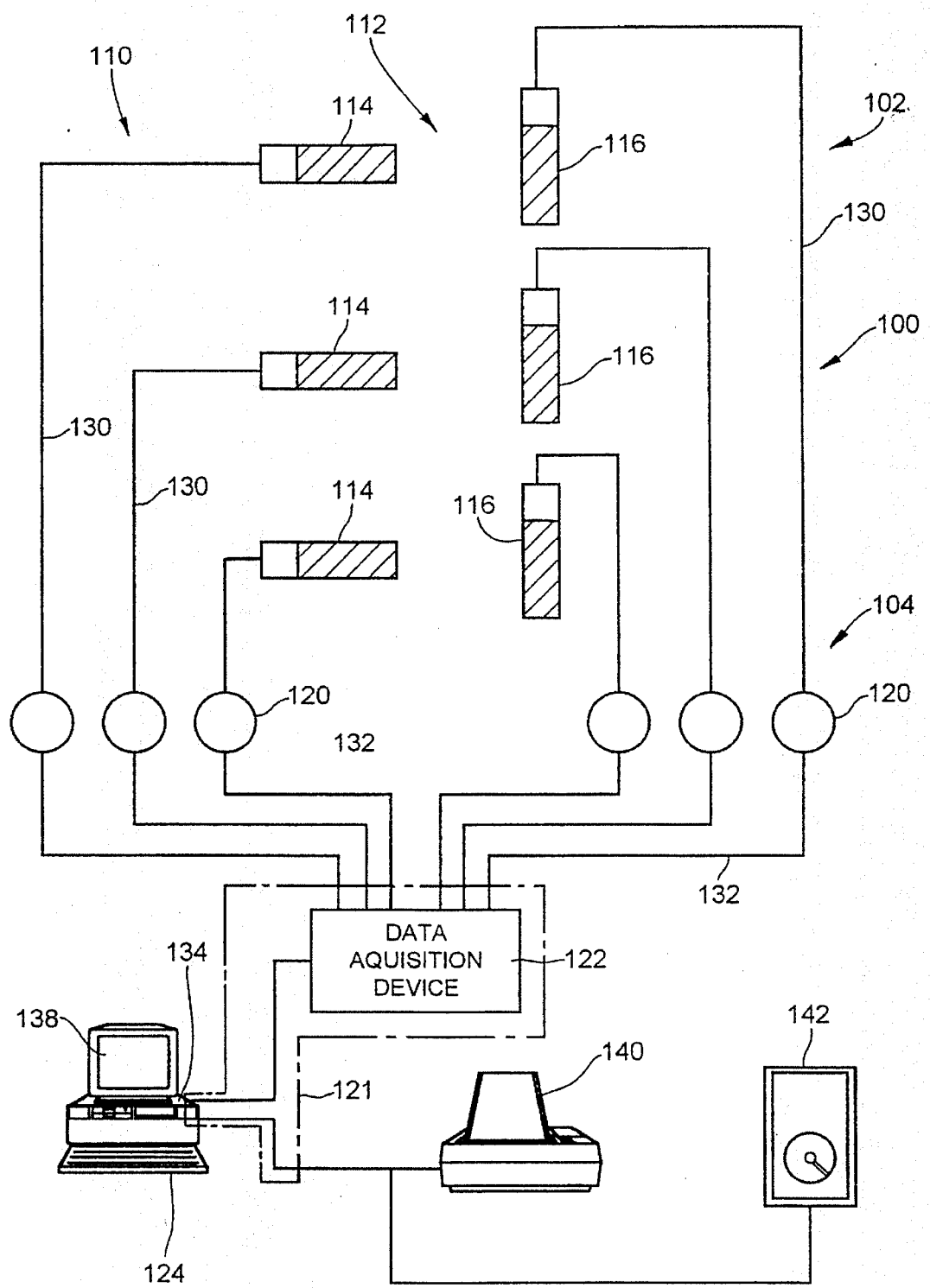
FIG. 3 shows an apparatus for determining the best position for the rotor relative to the stator.
Figure 4:
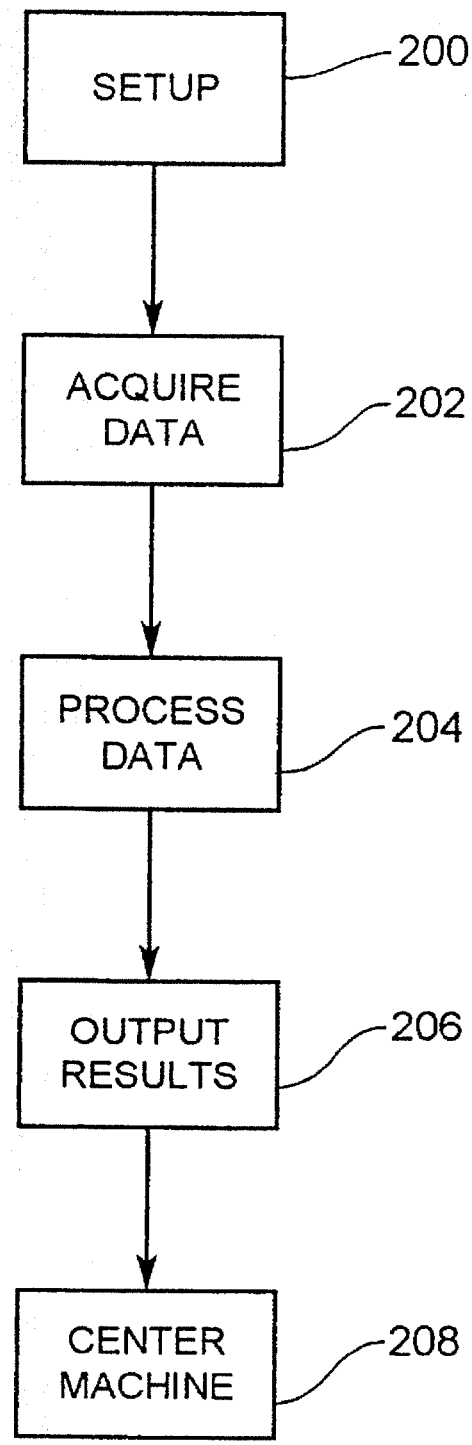
FIG. 4 is a block diagram showing the steps taken when determining the best position for the rotor relative to the stator using the apparatus illustrated in FIG. 3.

FIG. 3 best illustrates an apparatus 100 for determining the best position for the rotor 12 relative to the stator 14. Unlike the prior art manual method, the apparatus 100 detects electrically, the air gap 16 between the rotor 12 and stator 14 generally continuously through at least one complete revolution of the rotor 12 and preferably through two or three complete revolutions of the rotor 12. The apparatus 100 also computes a best position for the rotor 12 relative to the stator 14 based on the detected air gap measurements taken over the revolutions.

As can be seen, the apparatus 100 includes a sensor array 102 to detect the rotor to stator spacing, as well as the stator to rotor spacing, at a plurality of locations along the length of both the rotor 12 and the stator 14. The output of the sensor array 102 is conveyed to a processing unit 104. The processing unit 104 manipulates the output of the sensor array 102 and generates information concerning the best position for the rotor 12 relative to the stator 14 so that the position of the rotor 12 and/or stator 14 can be adjusted accordingly.

The sensor array 102 includes two sets of sensors 110 and 112 respectively, namely a set of three rotor sensors 114 and a set of three stator sensors 116. The rotor sensors 114 detect the rotor to stator spacing while the stator sensors 116 detect the stator to rotor spacing. The sensors are preferably of the non-contact capacitive-sensing type such as those manufactured by Vibro-Meter Inc. of Longueil, Quebec under Model No. VM 3.12. Each sensor 114 and 116 respectively is mounted on a flexible, thin flat permanent magnet (not shown) to allow the sensors to be individually attached and removed from the generator 10 easily and as desired. The sensors 114 and 116 are elongate and generally rectangular and therefore, have major and minor axes.

The processing unit 104 includes a plurality of line conditioners 120, a data acquisition system 121 and a computer 124. The line conditioners 120 receive the output signals of the sensors 114 and 116 via triaxial cables 130 and are preferably of the type manufactured by Vibro-Meter Inc. under model DCC63IN-5-2.54/25.4. The output signals of the line conditioners 120 are fed to the data acquisition system 121 via cables 132. Preferably, the data acquisition system 121 includes an 8 channel data acquisition device 122 of the type manufactured by Kiethley under model number 575. The output of the data acquisition device 122 is conveyed to the computer 124, which in the preferred form, is an IBM compatible lap top computer to allow the computer to be brought on site. The computer 124 has a data acquisition card 134 which also forms part of the data acquisition system 121 installed therein. Also installed in the computer 124 is appropriate software for interpreting and manipulating the digital data representing the output signals collected by the data acquisition device 122 to determine the best position for the rotor 12 relative to the stator 14. The computer 124 is also connected to one or more output devices such as a monitor 138 on which results and intermediate steps may be viewed, a printer 140 and a chart recorder 142 to allow acquired data, intermediate results and/or the determined best position for the rotor 12 relative to the stator to be hard copied.

The operation of the apparatus 100 will now be described with reference to FIGS. 1 to 4. When it is desired to examine the generator 10 to determine whether the rotor 12 is located at the "best position" within the stator 14, the apparatus 100 is used and is connected to the generator 10. This requires the sensor array 102 to be properly positioned within the generator (see FIG. 2). Specifically, the three rotor sensors 114 are positioned on one face of a selected pole 20 of the rotor 12 at generally equally, spaced locations and preferably near the ends and middle of the selected rotor pole 20. The sensors 114 are oriented so that their major axes are perpendicular to the major axis of the pole face.

The three stator sensors 116 are positioned on a stator pole position 150 at generally equally spaced locations, and similar to the rotor sensors, preferably near the ends and middle of the stator pole position 150. Unlike the rotor sensors, the stator sensors 116 are oriented so that their major axes are in line and are parallel to the major axis of the rotor pole 20. It should however, be apparent to those of skill in the art that depending on the configuration of the rotary machine, the number and orientation of the sensors 114 and 116 respectively may vary. The flexible permanent magnets on which the sensors 114 and 116 are mounted, hold the sensors in place once they have been positioned at their desired locations. As the sensors 114 and 116 are being positioned within the generator 10, the rotor pole 20 and the stator 14 are grounded via cables 152 and 154 respectively.

Once positioned within the generator 10, the rotor sensors 114 and the adjacent stator pole position form parallel plate capacitors with the air gap 16 between the sensors 114 and the stator pole position constituting the dielectric of the capacitors. Similarly, the stator sensors 116 and the adjacent pole 20 of the rotor 12 form parallel plate capacitors with the air gap 16 between the sensors 116 and the rotor pole 20 constituting the dielectric of the capacitors.

After the sensors 114 and 116 have been positioned, the cables 130 are wound about the rotor 12 in a direction opposite the proposed direction of rotation of the rotor so that the cables 130 will unwind as the rotor is turned. This avoids the cables 130 from being wound about the rotor 112 and hence, from pulling on the sensors 114 and 116 which may result in movement or removal of the sensors from the respective sections of the generator 10 or breakage of the cables 130.

Once this has been done, the computer 124 is initialized (block 200) so that output signals generated by the sensors 114 and 116 are properly processed and captured by the computer 124. The computer has appropriate software therein to control the Keithley data acquisition system 121 (both the device 122 and card 134) as well as to process the digital data received from it. In the present embodiment, Labtech 6.0® is used to control the data acquisition system 121 while Microsoft Excel 6.0® is used to process the digital data acquired from the data acquisition system 121 and place it in spreadsheet form. Therefore, during initialization of the computer 124, the initial operating parameters for Labtech® are entered and these include start time, stop time and the approximate velocity of the rotor 12. The computer 124, based on the entered velocity, calculates a sampling rate for polling the output of the sensors 114 and 116. The calculated sampling rate is such that the output of the sensors is polled at least fifteen times between rotor pole centers and preferably between 30 and 40 times. It has been found that this sampling rate gives a good indication that the readings are consistent and provides sufficient information to ensure accuracy when assessing the readings. Also, the sampling rate ensures that data overload does not occur. It should be realized that if the velocity of the rotor is lower, the sampling rate will be reduced and if the velocity of the rotor is higher, the sampling rate will be increased.

After this, the rotor 12 is rotated at the approximated velocity and the sensors 114 and 116 are supplied with a high frequency constant voltage source from data acquisition device 122. Each sensor in turn generates a modulated capacitive output current signal which varies as an inverse function of the air gap 16 between itself and the respective stator pole position or itself and the rotor pole, whichever the case may be. Details of the sensors and their operation can be found in U.S. Pat. No. 4,675,670 to Lalonde et al. Thus, the output current signals generated by the sensors are representative of the air gap 16 between the rotor 12 and the stator 14 at a number of locations along the length of both the rotor and the stator. The magnitudes of the current signals vary as the air gap between the rotor and the stator varies. The specific sensors used in this embodiment, generate an output current having a magnitude between 4 and 20 milliamps when the air gap 16 is between 100 and 1000 thousandths of an inch. The output current varies linearly as the air gap varies between these values.

The sensors 114 are oriented with their major axis normal to the major axis of the rotor pole 20 for a specific reason. Because the stator 14 is not solid copper but rather is constituted by copper stator windings separated by non-metallic "wedges", the sensors 114 generate inaccurate output signals when oriented with their major axes parallel to the major axis of the rotor pole. This is due to the fact that the sensors 114 will not detect the wedge distances accurately. However, when the sensors 114 are oriented in the manner shown in the Figures, the sensors 114 cover several stator windings and wedges. Thus, the output signals generated by these sensors is an average resulting in steady, consistent output signals which can be convened by the computer 124 into accurate air gap readings after being factored by an appropriate constant.

The output current signals from the sensors 114 and 116 are conveyed to the line conditioners 120 via cables 130 before being conveyed to the data acquisition device 122 via cables 132. Each line conditioner 120 includes a set of precision resistors (not shown) to convert the current signals to voltages, as well as an offset compensator to adjust the voltages to compensate for the thickness of the sensors. The data acquisition device 122 collects the output voltages from the line conditioners 120 at the calculated sampling rate and converts the voltages from analog signals to digital data. The data acquisition device then encodes the digital data and conveys the digital data to the data acquisition card 134 in the computer 124 when polled by Labtech® (see block 202). Details of this operation can be found in Document No. 575-901-01 Rev. B published by Kiethley. The computer 124 then manipulates the digital data to obtain data proportional to the air gap 16 between the rotor 12 and stator 14 near the ends and middle of the rotor and the stator as will be described.

As Labtech® polls the dam acquisition system 122, it stores the digital data in a file within the memory of the computer 124. The digital data is then convened from milliamp readings to engineering units (thousandths of an inch). At this point, the converted digital data is displayed on the monitor 138 so that the data can be visually scanned to be certain there are no obvious spurious readings. The entire file is then transferred to the Microsoft Excel® spreadsheet for processing (block 204).

The spreadsheet is laid out in the manner shown in FIGS. 5a and 5b. As can be seen, the spreadsheet includes three columns A to C associated with the output of each of the individual stator sensors 116 and three columns D to F associated with the output of each of the individual rotor sensors 114. Once all of the digital data has been collected by the computer, the digital data is processed. In particular, columns A, B, and C are highlighted and an averaging macro is executed. This macro takes the first reading in each of columns A, B and C and averages the readings (A+B+C/3). The averaged reading is then entered into column G of the spreadsheet. The macro then performs the same averaging on the second reading in each of columns A, B, C and enters the averaged reading into column G. This macro is executed until all readings in columns A, B, C have been averaged. Once this has been completed, the same macro is then executed on the readings in columns D, E and F with the averaged readings being entered into column H of the spreadsheet.

Because the sensors 116 mounted on the stator pole position 150 go to their maximum readings midway between rotor poles (i.e. whenever a rotor pole has passed by them and the next rotor pole is not yet in front of them), the rotor pole passing by the sensors 116 can be determined by manually scanning the data and counting the poles up or down depending on the direction of rotation of the rotor 12. The lowest readings, which represent the minimum average air gap between each rotor pole and the sensors 116 are then highlighted, numbered with their appropriate rotor pole numbers and moved into column I of the spreadsheet.

Because the rotor pole can be determined by looking at the readings, it is also possible to determine the position of the sensors 114 on the rotor pole. Every time a rotor pole face is detected by sensors 116, it can be determined that the sensors on the rotor pole have moved by an amount equal to (360° /(number of rotor poles in generator)). The readings acquired via the sensors 114 which are in line horizontally on the spreadsheet with the minimum readings generated by the sensors 116, are then highlighted and moved to column J of the spreadsheet. These readings are also assigned position numbers or are labelled in degrees depending on preference.

The readings entered in column J are then arithmetically adjusted by a constant via a macro to compensate for the fact that the output of sensors 114 is an average over a number of stator windings and non-metallic wedges which cause a substantially constant error in the readings acquired by sensors 114. To determine the constant, at least one of very accurate manual air gap measurement is taken at one position before data acquisition begins. The manual measurements are entered in the computer 124. The difference between these measurements and the readings which the sensors produce is used as the constant and the readings are arithmetically adjusted by, for example, subtracting the constant from all the readings. Once the macro has completed the arithmetic adjustment of the readings, the adjusted readings are entered into column K. Thus, columns I and K store readings which represent the actual air gaps between the sensors 116 and rotor poles 20 and the sensors 114 and stator pole positions, respectively.

Once the air gap readings have been stored in columns I and K, the best position for the rotor relative to the stator is determined by the computer 124. The best position is calculated in the manner described below.

Figure 6:
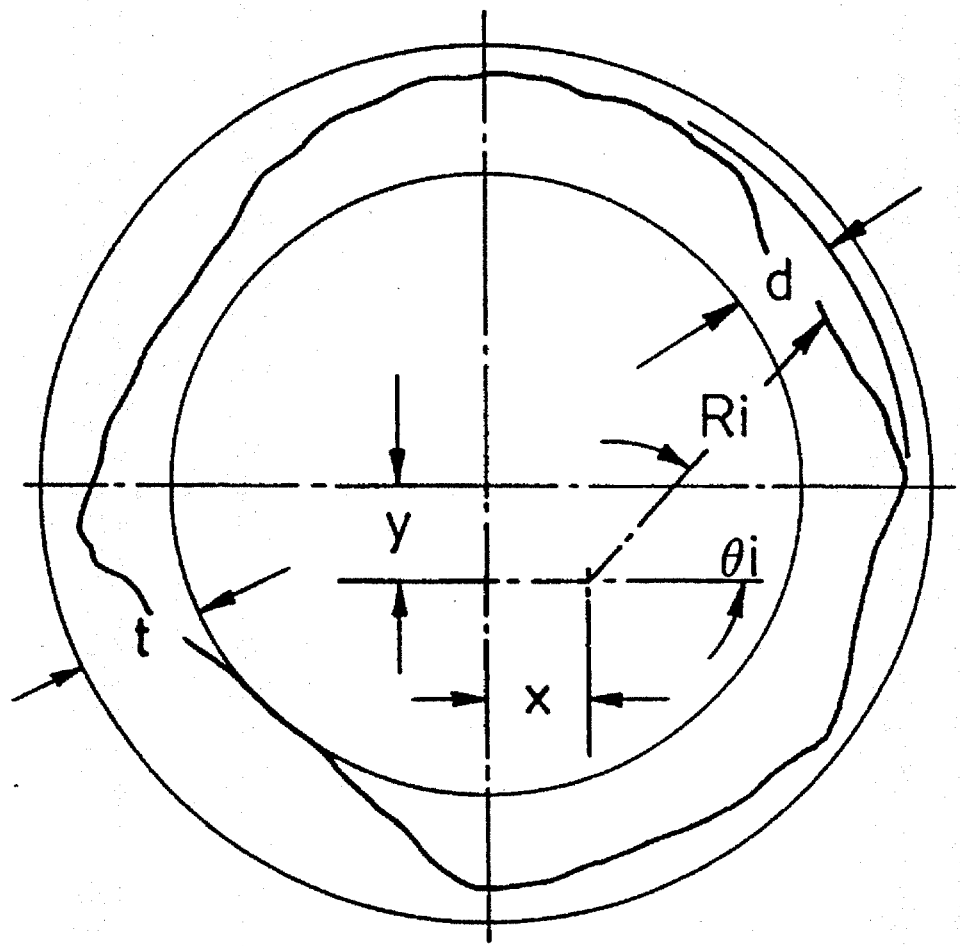
FIG. 6 is a circularity diagram.

Circularity can be defined as a zone limited by two concentric circles "t" having as their center, the best center of the component being verified. The deviation "d" in circularity is the difference between the maximum and minimum radii as measured and calculated from the best center (see FIG. 6). The best center of a generally circular component is that which gives the minimum deviation in circularity for any given set of equally spaced readings of radius. Its location is calculated from the series of equally spaced readings of radius from a reference located near the best center as indicated on FIG. 6. The "x" and "y" components of the best center from the reference can be calculated using the following equations:

$$x = \frac{2}{n} \sum_{i=1}^{i=n} R_i \cos \theta_i$$

-continued $$y = \frac{2}{n} \sum_{i=1}^{i=n} R_1 \sin \theta_1$$

where:
n is the number of equally spaced readings of radius of the component being verified;

$R_1$ (1 to n) are the readings of radius; and $\theta_1$, (1 to n) are the counter-clockwise angles from the 3 o'clock position for the respective readings of radius.

After the "best center" has been calculated by the computer 124, the results can be displayed in a number of ways. Specifically, the chart recorder 142 can be used to output circularity diagrams similar to that shown in FIG. 6. The data can also be printed in table form via printer 140 and/or can be displayed on the monitor 138 (block 206).

With the "best center" calculated, the position of the rotor 12 and/or stator 14 can then be adjusted to the "best position" (see block 208) to optimize the performance of the generator 10 (block 208), wherein the best center determined for the rotor intersects the best center determined for the stator.

Appendix A shows the results of the present invention being used at the Washington Water Power Cabinet Gorge on Generator No. 1. Appendix pages A1 to A8 describe the measurements taken by three sensors 116 on a stator pole position and show plots of the shape of the rotor. Appendix pages A9 to A16 describe the measurements taken by three sensors 114 on a rotor pole and show plots of the shape of the stator. Appendix pages A17 to A20 describe the present invention being used to determine the profile of a draft tube in the Water Power Cabinet.

Although the measurements have been described as being used to determine the best position of the rotor relative to the stator, it should be realized that the output of the sensors 114 allow the computer 124 to generate a profile of the stator 14 while the output of the sensors 116 allows the computer to generate a profile of the rotor 12. The profiles can be used to keep a "history" of the generator 10 to provide preventive maintenance information etc.

Although not illustrated in the drawings, it should be realized that the apparatus 100 can also be used to check shaft alignment and bearing and shaft runouts. This is achieved by using the sensors to detect the spacing between the shaft and bearings.

Although the preferred embodiment of the present invention has been described with reference to determining the best position for the rotor within the stator in an electric generator, it should be apparent to those of skill in the art that the present method and apparatus can be used to determine the best position for two members rotatable relative to one another within basically any rotary machine. This is achieved by measuring via at least one sensor, the space between the inner and outer members at at least one location along the length of one the inner and outer members during at least one revolution and processing the measurements to determine the best position for the inner member relative to the outer member. Of course, when a plurality of sensors are used and positioned at spaced locations along both the inner and outer members, the accuracy of the determined best position for the inner member relative to the outer member is significantly increased. Also, by using a plurality of sensors on both the inner and outer members, profiles of the two members can be created to allow deviations in the physical shape of the members to be detected.

It should also be apparent to those of skill in the art that other types of non-contacting sensors may be used to measure the space between the inner and outer members. Although the apparatus 100 has been described with reference to specific hardware and software, it should be apparent to those of skill in the art, that other hardware and software can be used to achieve the same functionality. It should also be realized that many variations to the present invention may be made without departing from the scope thereof as defined by the appended claims.

*Appendix A*

ROTOR SECTION

- THIS SECTION SHOWS THE AIRGAP MEASUREMENT LOOKING FROM THE STATOR TOWARDS THE ROTOR POLES FROM A POINT DIRECTLY UPSTREAM,. THREE MEASUREMENTS ARE TAKEN OF EACH POLE, ONE AT THE TOP ONE IN THE MIDDLE AND ONE AT THE BOTTOM. THE "SAMPLE TIME" OF THE DATA ACQUISITION SYSTEM IS SET SO THAT AT LEAST 15 TO 20 SAMPLES ARE TAKEN ON EACH.OF THE SENSORS AS EACH POLE FACE IS ROTATED BY.

ROTOR TABLE 1 (RT-1)

COLUMN ONE    LISTS THE AVERAGE MINIMUM AIR GAP FOR EACH POLE AS MEASURED FROM THE UPSTREAM SENSORS ON THE STATOR

COLUMN TWO    LISTS THE POLE NUMBERS

COLUMN THREE   LISTS THE VALUES WHICH WERE PLOTTED ON THE GRAPHS (BECAUSE THE SENSORS ARE "LOOKING IN" TOWARDS THE ROTOR ,TO GET A PROFILE OF THE SHAPE OF THE ROTOR THE ACTUAL AIRGAPS ARE SUBTRACTED FROM 1000 AND THE DIFFERENCES ARE PLOTTED)

ROTOR "BEST CENTRE" IN SHOWN ON THE TOP RIGHT HAND SIDE

ROTOR TABLE 2 (RT-2)

COLUMN ONE    LISTS THE POLE NUMBERS
COLUMN TWO    LISTS THE AVERAGE MINIMUM AIR GAP FOR EACH POLE
COLUMN THREE   LISTS THE DIFFERENCE BETWEEN THE AVERAGE MINIMUM AIR GAP FOR EACH POLE AND THE OVERALL AVERAGE AIRGAP FOR ALL THE POLES.
COLUMN FOUR    LISTS THE DIFFERENCE BETWEEN THE AVERAGE MINIMUM AIR GAP FOR EACH POLE AND THE AVERAGE MINIMUM AIR GAP FOR THE POLE WHICH IS 180 DEGREES OPPOSITE
COLUMN FIVE    LISTS THE PERCENT DIFFERENCE FOR THE NUMBERS IN COLUMN FOUR.

ROTOR CHART 1 (RC-1)

THIS PLOT SHOWS THE AVERAGE SHAPE OF THE ROTOR WITH A SCALE OF 50 MILS. ACTUAL AVERAGE AIRGAP READINGS FOR THE ROTOR MUST BE TAKEN FROM TABLE 1.

ROTOR CHART 2 (RC-2)

THIS PLOT SHOWS THE AVERAGE SHAPE OF THE ROTOR WITH A SCALE OF 40 MILS.

A1

ROTOR CHARTS 3 & 4 (RC-3 & RC-4)

THESE PLOTS SHOWS THE SHAPE OF THE ROTOR AT THE TOP, MIDDLE, AND BOTTOM. IF ACTUAL AIRGAP READINGS ARE REQUIRED FOR ANY OF THESE PLANES THIS INFORMATION CAN BE ACQUIRED FROM THE RAW DATA SECTION

DT-1

OG Actual & Plotted Rotor AirGaps March 94

Rotor Best Center

Pole = 18.73

Distance = 6.951

| ROTOR Actual Min AirGap | Pole Number | Plotted AirGaps (1000-Actual) |
|---|---|---|
| 683 | 1 | 317 |
| 682 | 2 | 318 |
| 682 | 3 | 318 |
| 681 | 4 | 319 |
| 679 | 5 | 321 |
| 681 | 6 | 319 |
| 678 | 7 | 322 |
| 678 | 8 | 322 |
| 675 | 9 | 325 |
| 679 | 10 | 321 |
| 680 | 11 | 320 |
| 676 | 12 | 324 |
| 677 | 13 | 323 |
| 680 | 14 | 320 |
| 679 | 15 | 321 |
| 680 | 16 | 320 |
| 682 | 17 | 318 |
| 682 | 18 | 318 |
| 678 | 19 | 322 |
| 681 | 20 | 319 |
| 676 | 21 | 324 |
| 674 | 22 | 326 |
| 672 | 23 | 328 |
| 673 | 24 | 327 |
| 672 | 25 | 328 |
| 668 | 26 | 332 |
| 671 | 27 | 329 |
| 673 | 28 | 327 |
| 674 | 29 | 326 |
| 673 | 30 | 327 |
| 678 | 31 | 322 |
| 683 | 32 | 317 |
| 683 | 33 | 317 |
| 683 | 34 | 317 |
| 689 | 35 | 311 |
| 687 | 36 | 313 |
| 686 | 37 | 314 |
| 687 | 38 | 313 |
| 689 | 39 | 311 |
| 688 | 40 | 312 |
| 689 | 41 | 311 |
| 684 | 42 | 316 |
| 688 | 43 | 312 |
| 691 | 44 | 309 |
| 692 | 45 | 308 |
| 691 | 46 | 309 |
| 688 | 47 | 312 |
| 692 | 48 | 308 |
| 689 | 49 | 311 |
| 687 | 50 | 313 |
| 686 | 51 | 314 |
| 686 | 52 | 314 |
| 686 | 53 | 314 |
| 688 | 54 | 312 |
| 687 | 55 | 313 |
| 687 | 56 | 313 |
| 685 | 57 | 315 |
| 684 | 58 | 316 |
| 685 | 59 | 315 |
| 683 | 60 | 317 |

A3

RT-2

| Poles | ROTOR AVG AIRGAP | AIRGAP MINUS 682.08 AVG | 180 DEG DIFF | Rotation of Poles 0 = 30 DIFF PERCENT CHANGE |
|---|---|---|---|---|
| 1 | 683 | 1 | -5 | -0.66 |
| 2 | 682 | 0 | 1 | 0.15 |
| 3 | 682 | 0 | 1 | 0.20 |
| 4 | 681 | -1 | 2 | 0.34 |
| 5 | 679 | -3 | 9 | 1.37 |
| 6 | 681 | -1 | 6 | 0.88 |
| 7 | 678 | -4 | 9 | 1.27 |
| 8 | 678 | -4 | 9 | 1.32 |
| 9 | 675 | -7 | 14 | 2.05 |
| 10 | 679 | -3 | 9 | 1.32 |
| 11 | 680 | -2 | 9 | 1.27 |
| 12 | 676 | -6 | 9 | 1.27 |
| 13 | 677 | -5 | 11 | 1.61 |
| 14 | 680 | -2 | 11 | 1.56 |
| 15 | 679 | -3 | 13 | 1.96 |
| 16 | 680 | -2 | 12 | 1.71 |
| 17 | 682 | 0 | 6 | 0.93 |
| 18 | 682 | 0 | 10 | 1.47 |
| 19 | 678 | -4 | 11 | 1.66 |
| 20 | 681 | -1 | 6 | 0.88 |
| 21 | 676 | -6 | 10 | 1.52 |
| 22 | 674 | -8 | 12 | 1.76 |
| 23 | 672 | -10 | 15 | 2.15 |
| 24 | 673 | -9 | 14 | 2.10 |
| 25 | 672 | -10 | 15 | 2.20 |
| 26 | 668 | -14 | 19 | 2.83 |
| 27 | 671 | -11 | 15 | 2.15 |
| 28 | 673 | -9 | 11 | 1.61 |
| 29 | 674 | -8 | 12 | 1.71 |
| 30 | 673 | -9 | 10 | 1.47 |
| 31 | 678 | -4 | | |
| 32 | 683 | 1 | | |
| 33 | 683 | 1 | | |
| 34 | 683 | 1 | | |
| 35 | 689 | 7 | | |
| 36 | 687 | 5 | | |
| 37 | 686 | 4 | | |
| 38 | 687 | 5 | | |
| 39 | 689 | 7 | | |
| 40 | 688 | 6 | | |
| 41 | 689 | 7 | | |
| 42 | 684 | 2 | | |
| 43 | 688 | 6 | | |
| 44 | 691 | 9 | | |
| 45 | 692 | 10 | | |
| 46 | 691 | 9 | | |
| 47 | 688 | 6 | | |
| 48 | 692 | 10 | | |
| 49 | 689 | 7 | | |
| 50 | 687 | 5 | | |
| 51 | 686 | 4 | | |
| 52 | 686 | 4 | | |
| 53 | 686 | 4 | | |
| 54 | 688 | 6 | | |
| 55 | 687 | 5 | | |
| 56 | 687 | 5 | | |
| 57 | 685 | 3 | | |
| 58 | 684 | 2 | | |
| 59 | 685 | 3 | | |
| 60 | 683 | 1 | | |

A4

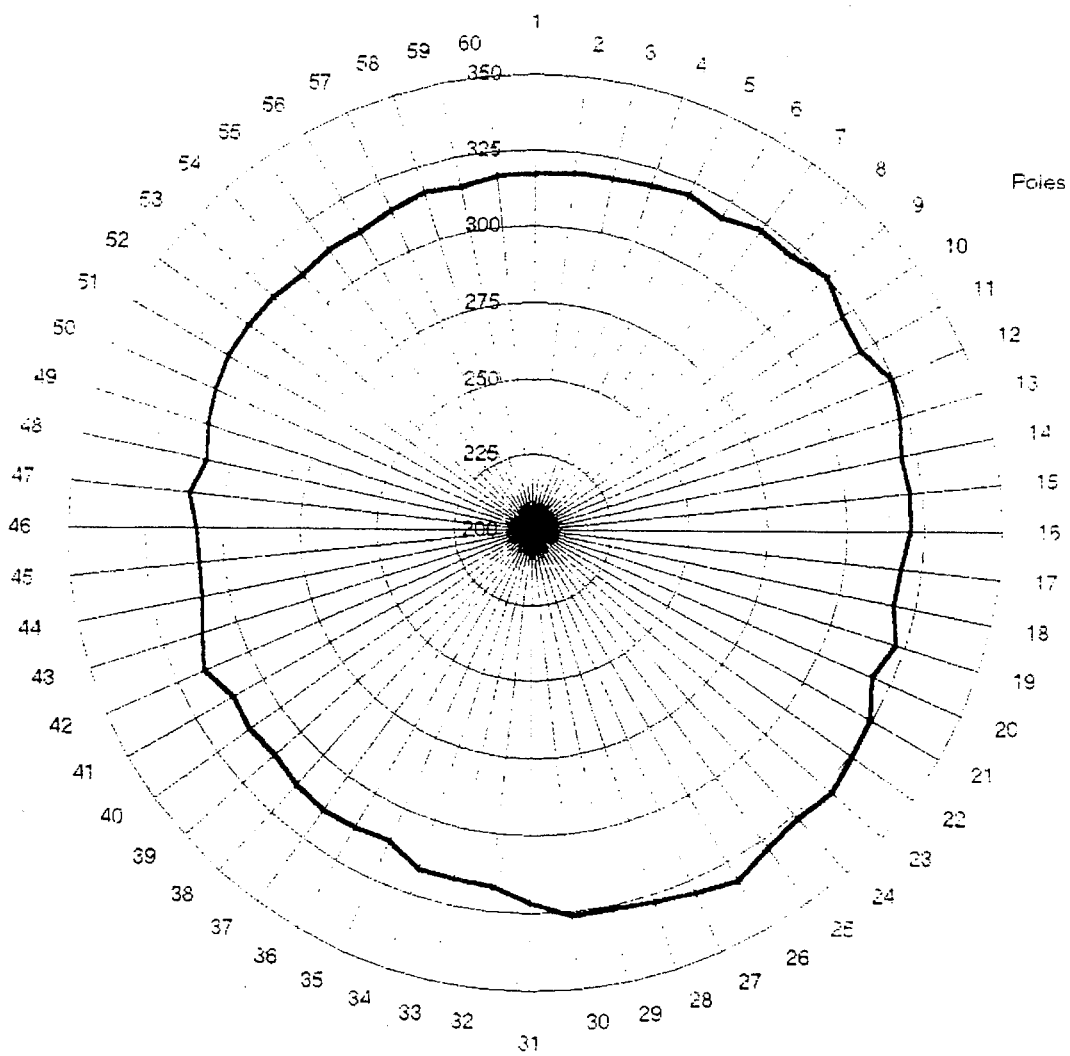
CG Plotted Rotor AirGaps (see table for actuals)  March 94
Reference Upstream

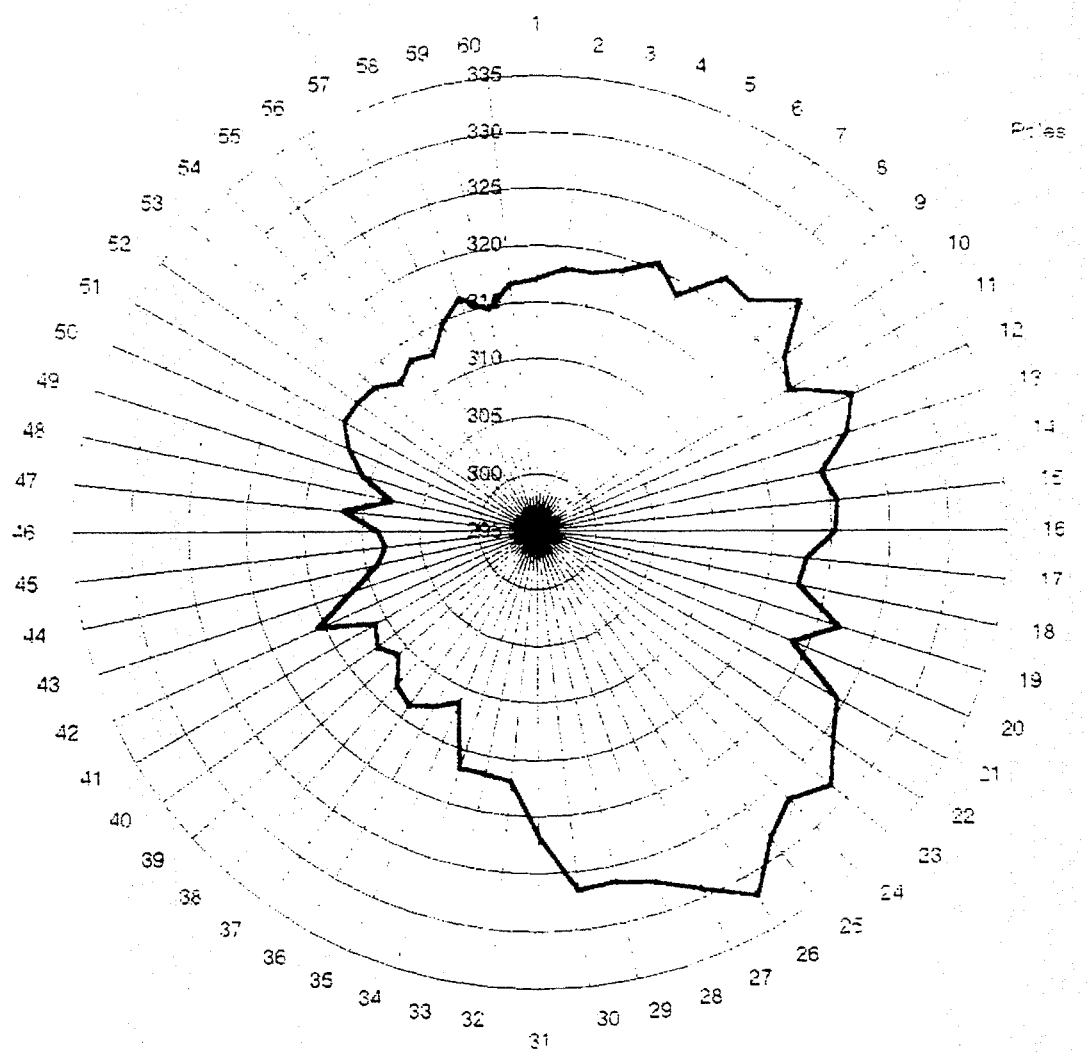
**CG Plotted Rotor AirGaps (see table for actuals)   March 94
Reference Upstream**

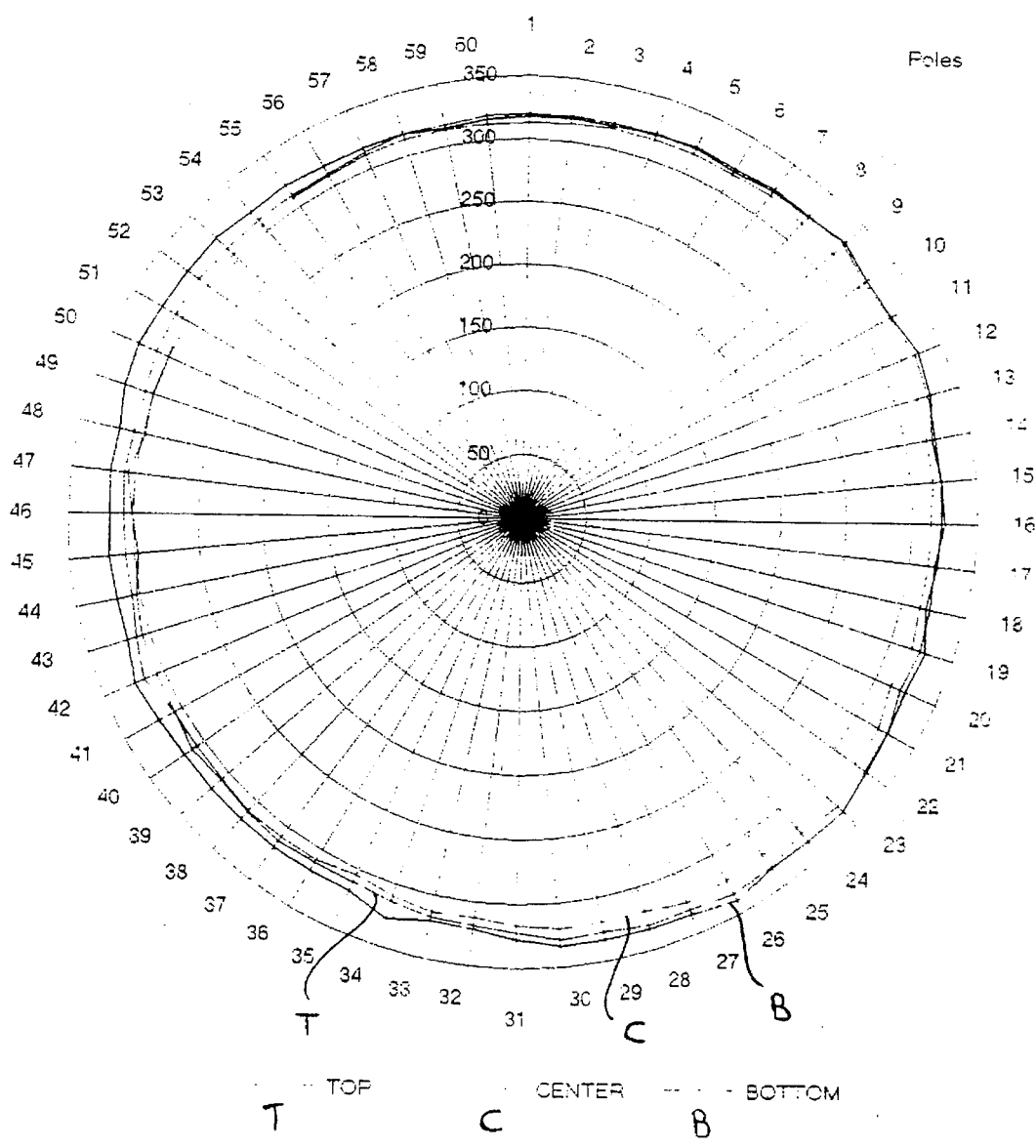
CG Rotor Three Plane Airgaps March 94 Reference Upstream

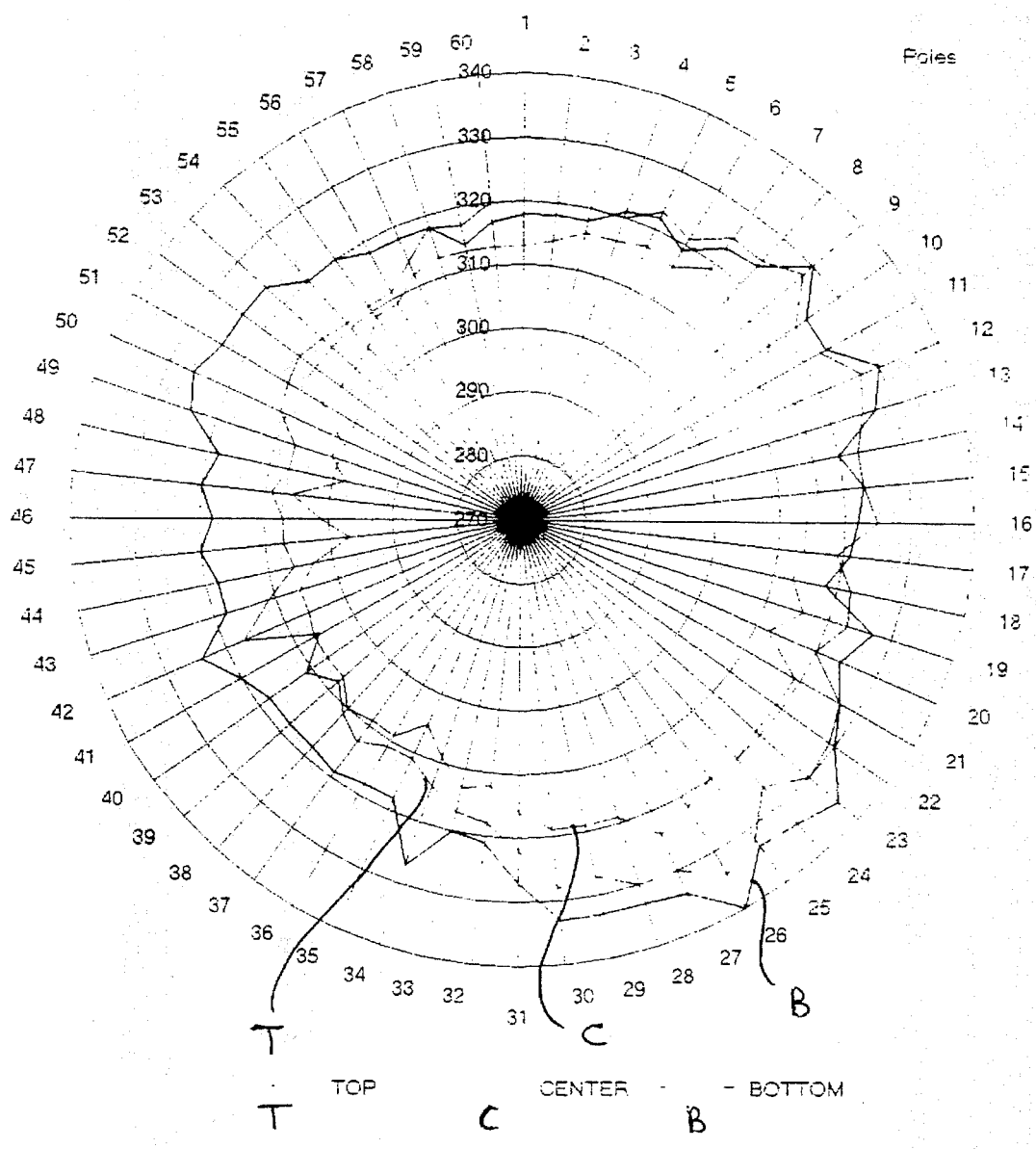

STATOR SECTION

THIS SECTION SHOWS THE AIRGAP MEASUREMENTS FROM POLE 1 LOOKING OUT TOWARDS THE STATOR AS POLE 2 IS ROTATED AROUND 360 DEGREES. FOR CONVENIENCE SAKE ONLY THE READINGS WHICH CORRESPOND WITH THE MINIMUM ROTOR READINGS ARE PLOTTED ,THEREFORE ALL PLOTS ETC; ARE SHOWN IN DEGREES WITH 60 POSITIONS PLOTTED

STATOR TABLE 1 (ST-1)

COLUMN ONE    LISTS THE DEGREES CLOCKWISE FROM UPSTREAM LOOKING DOWN ON THE STATOR

COLUMN TWO    LISTS THE MINIMUM AVERAGE AIRGAP FOR THAT POSITION

"BEST CENTRE" IN SHOWN ON THE TOP RIGHT HAND SIDE

STATOR TABLE 2 (ST-2)

COLUMN ONE    LISTS THE POSITION NUMBERS
COLUMN TWO    LISTS THE AVERAGE AIR GAP FOR EACH POSITION
COLUMN THREE  LISTS THE DIFFERENCE BETWEEN THE AVERAGE AIRGAP FOR EACH POSITION AND THE OVERALL AVERAGE AIRGAP FOR ALL THE POSITIONS
COLUMN FOUR   LISTS THE DIFFERENCE BETWEEN THE AVERAGE AIR GAP FOR EACH POSITION AND THE AVERAGE AIR GAP FOR THE POSITION WHICH IS 180 DEGREES OPPOSITE.
COLUMN FIVE    LISTS THE PERCENT DIFFERENCE FOR THE NUMBERS IN COLUMN FOUR

STATOR CHART 1 (SC-1)

THIS PLOT SHOWS THE ACTUAL SHAPE AND AVERAGED AIRGAP READINGS AS MEASURED FROM POLE 2 TO THE STATOR (SCALE IS 700 MILS)

STATOR CHART 2 ( SC-2)

THIS PLOT ALSO SHOWS THE ACTUAL SHAPE AND AVERAGED AIRGAP READINGS AS MEASURED FROM POLE 2 TO THE STATOR (SCALE IS 100 MILS)

A9

STATOR CHART 3 (SC-3)

THIS PLOT SHOWS THE ACTUAL AIR GAP READINGS AT THE TOP, MIDDLE, AND BOTTOM OF THE STATOR AS MEASURED FROM POLE 2 SCALE IS 700 MILS

STATOR CHART 4 (SC-4)

THIS PLOT SHOWS THE ACTUAL AIR GAP READINGS AT THE TOP, MIDDLE, AND BOTTOM OF THE STATOR AS MEASURED FROM POLE 2 SCALE IS 120 MILS

STATOR
CG Stator Actual Average Airgap Measured From Pole 2
(Mar 94 .0 Deg Upstream)

| Degrees | Airgap | |
|---|---|---|
| 0 | 677 | Stator Best Center |
| 6 | 682 | |
| 12 | 673 | Degrees = 339 |
| 18 | 679 | |
| 24 | 666 | Distance = 16.7 |
| 30 | 665 | |
| 36 | 656 | |
| 42 | 652 | |
| 48 | 646 | |
| 54 | 655 | |
| 60 | 651 | |
| 66 | 654 | |
| 72 | 654 | |
| 78 | 656 | |
| 84 | 654 | |
| 90 | 651 | |
| 96 | 645 | |
| 102 | 649 | |
| 108 | 651 | |
| 114 | 646 | |
| 120 | 651 | |
| 126 | 647 | |
| 132 | 653 | |
| 138 | 653 | |
| 144 | 639 | |
| 150 | 643 | |
| 156 | 637 | |
| 162 | 628 | |
| 168 | 635 | |
| 174 | 634 | |
| 180 | 638 | |
| 186 | 647 | |
| 192 | 643 | |
| 198 | 641 | |
| 204 | 641 | |
| 210 | 644 | |
| 216 | 642 | |
| 222 | 643 | |
| 228 | 637 | |
| 234 | 640 | |
| 240 | 640 | |
| 246 | 641 | |
| 252 | 645 | |
| 258 | 645 | |
| 264 | 638 | |
| 270 | 640 | |
| 276 | 636 | |
| 282 | 639 | |
| 288 | 641 | |
| 294 | 651 | |
| 300 | 657 | |
| 306 | 661 | |
| 312 | 674 | |
| 318 | 675 | |
| 324 | 678 | |
| 330 | 683 | |
| 336 | 679 | |
| 342 | 677 | |
| 348 | 675 | |
| 354 | 678 | |

A11

| POSITION | STATOR AVG | AIRGAP MINUS 652.53 AVG | 180 DEG DIFF | Position at Rphase0 = 30 PERCENT CHANGE | POSITION | Degrees |
|---|---|---|---|---|---|---|
| | | | | | 1 | 254 |
| | | | | | 2 | 0 |
| | | | | | 3 | 6 |
| 1 | 679 | 25 | -44 | -6.70 | 4 | 12 |
| 2 | 677 | 25 | -39 | -6.03 | 5 | 18 |
| 3 | 682 | 29 | -35 | -5.37 | 6 | 24 |
| 4 | 673 | 20 | -30 | -4.55 | 7 | 30 |
| 5 | 679 | 26 | -38 | -5.78 | 8 | 36 |
| 6 | 666 | 13 | -25 | -3.78 | 9 | 42 |
| 7 | 665 | 12 | -21 | -3.17 | 10 | 48 |
| 8 | 656 | 3 | -14 | -2.15 | 11 | 54 |
| 9 | 652 | -1 | -9 | -1.38 | 12 | 60 |
| 10 | 646 | -7 | -9 | -1.38 | 13 | 66 |
| 11 | 655 | 2 | -15 | -2.25 | 14 | 72 |
| 12 | 651 | -1 | -12 | -1.79 | 15 | 78 |
| 13 | 654 | 1 | -13 | -2.04 | 16 | 84 |
| 14 | 654 | 1 | -9 | -1.33 | 17 | 90 |
| 15 | 656 | 4 | -11 | -1.69 | 18 | 96 |
| 16 | 654 | 2 | -16 | -2.51 | 19 | 102 |
| 17 | 651 | -1 | -11 | -1.74 | 20 | 108 |
| 18 | 645 | -7 | -9 | -1.43 | 21 | 114 |
| 19 | 649 | -4 | -10 | -1.48 | 22 | 120 |
| 20 | 651 | -2 | -10 | -1.48 | 23 | 126 |
| 21 | 646 | -6 | 4 | 0.66 | 24 | 132 |
| 22 | 651 | -2 | 6 | 0.92 | 25 | 138 |
| 23 | 647 | -5 | 14 | 2.20 | 26 | 144 |
| 24 | 653 | 0 | 21 | 3.22 | 27 | 150 |
| 25 | 653 | 1 | 21 | 3.27 | 28 | 156 |
| 26 | 639 | -13 | 39 | 5.99 | 29 | 162 |
| 27 | 643 | -10 | 40 | 6.13 | 30 | 168 |
| 28 | 637 | -16 | 43 | 6.54 | 31 | 174 |
| 29 | 628 | -24 | 49 | 7.45 | 32 | 180 |
| 30 | 635 | -17 | 40 | 6.08 | 33 | 186 |
| 31 | 634 | -18 | | | 34 | 192 |
| 32 | 638 | -15 | | | 35 | 198 |
| 33 | 647 | -6 | | | 36 | 204 |
| 34 | 643 | -9 | | | 37 | 210 |
| 35 | 641 | -12 | | | 38 | 216 |
| 36 | 641 | -12 | | | 39 | 222 |
| 37 | 644 | -8 | | | 40 | 228 |
| 38 | 642 | -11 | | | 41 | 234 |
| 39 | 643 | -10 | | | 42 | 240 |
| 40 | 637 | -16 | | | 43 | 246 |
| 41 | 640 | -12 | | | 44 | 252 |
| 42 | 640 | -13 | | | 45 | 258 |
| 43 | 641 | -12 | | | 46 | 264 |
| 44 | 645 | -8 | | | 47 | 270 |
| 45 | 645 | -7 | | | 48 | 276 |
| 46 | 638 | -15 | | | 49 | 282 |
| 47 | 640 | -13 | | | 50 | 288 |
| 48 | 636 | -17 | | | 51 | 294 |
| 49 | 639 | -13 | | | 52 | 300 |
| 50 | 641 | -11 | | | 53 | 306 |
| 51 | 651 | -2 | | | 54 | 312 |
| 52 | 657 | 4 | | | 55 | 318 |
| 53 | 661 | 8 | | | 56 | 324 |
| 54 | 674 | 21 | | | 57 | 330 |
| 55 | 675 | 22 | | | 58 | 336 |
| 56 | 678 | 25 | | | 59 | 342 |
| 57 | 683 | 30 | | | 60 | 348 |
| 58 | 679 | 27 | | | | |
| 59 | 677 | 24 | | | | |
| 60 | 675 | 22 | | | | |

A12

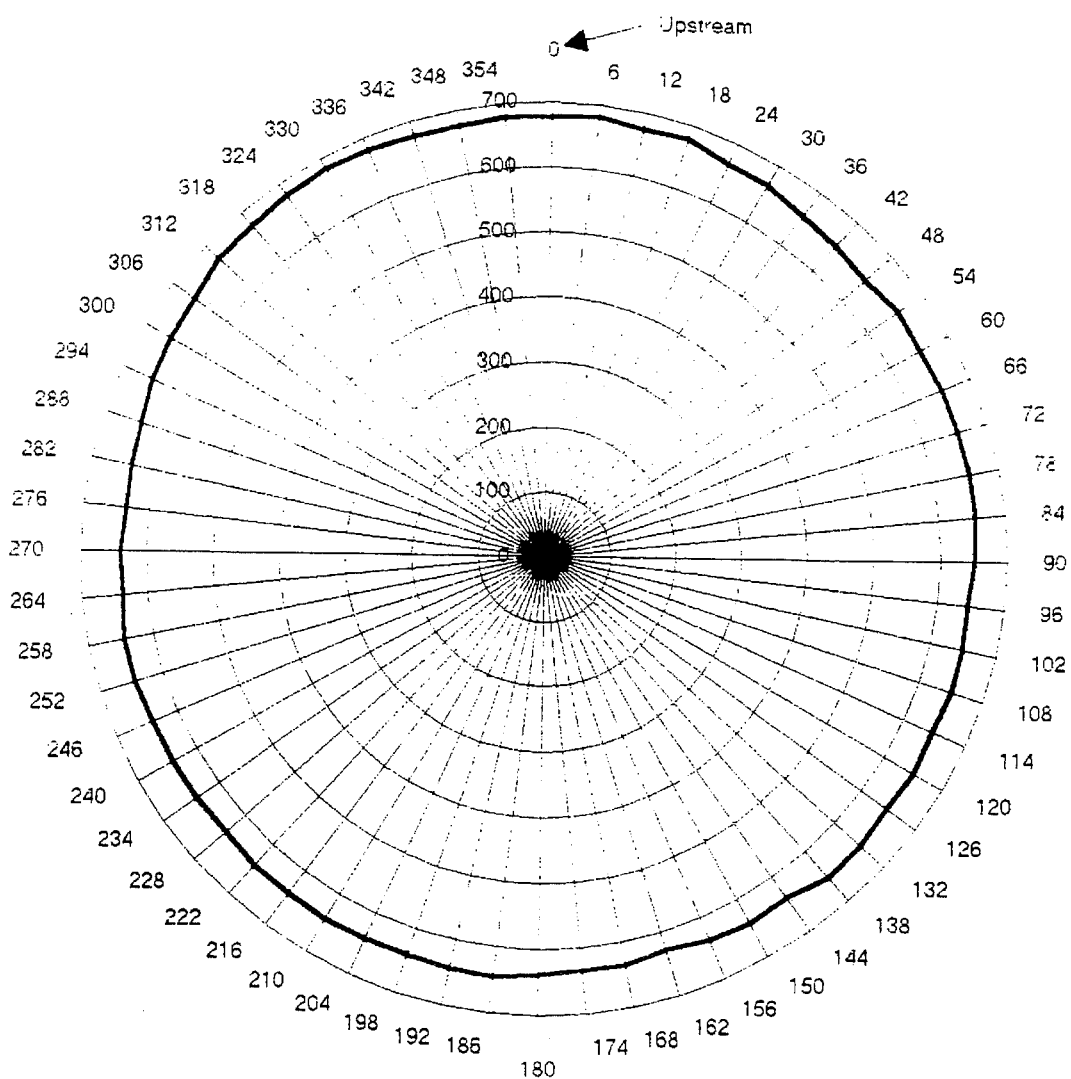
CG Stator Actual Average Airgap Measured From Pole 2 March 1994 (0 Deg Upstream)

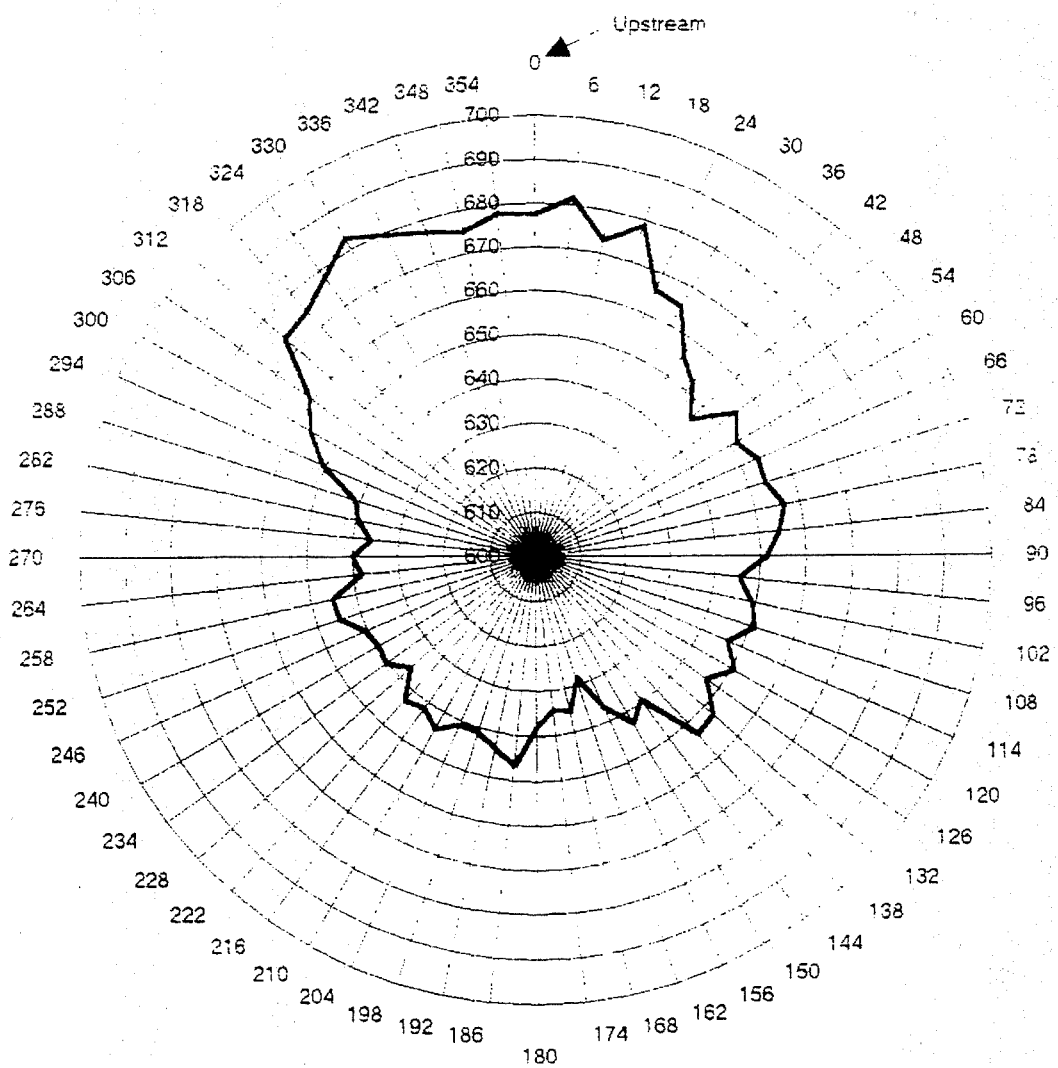

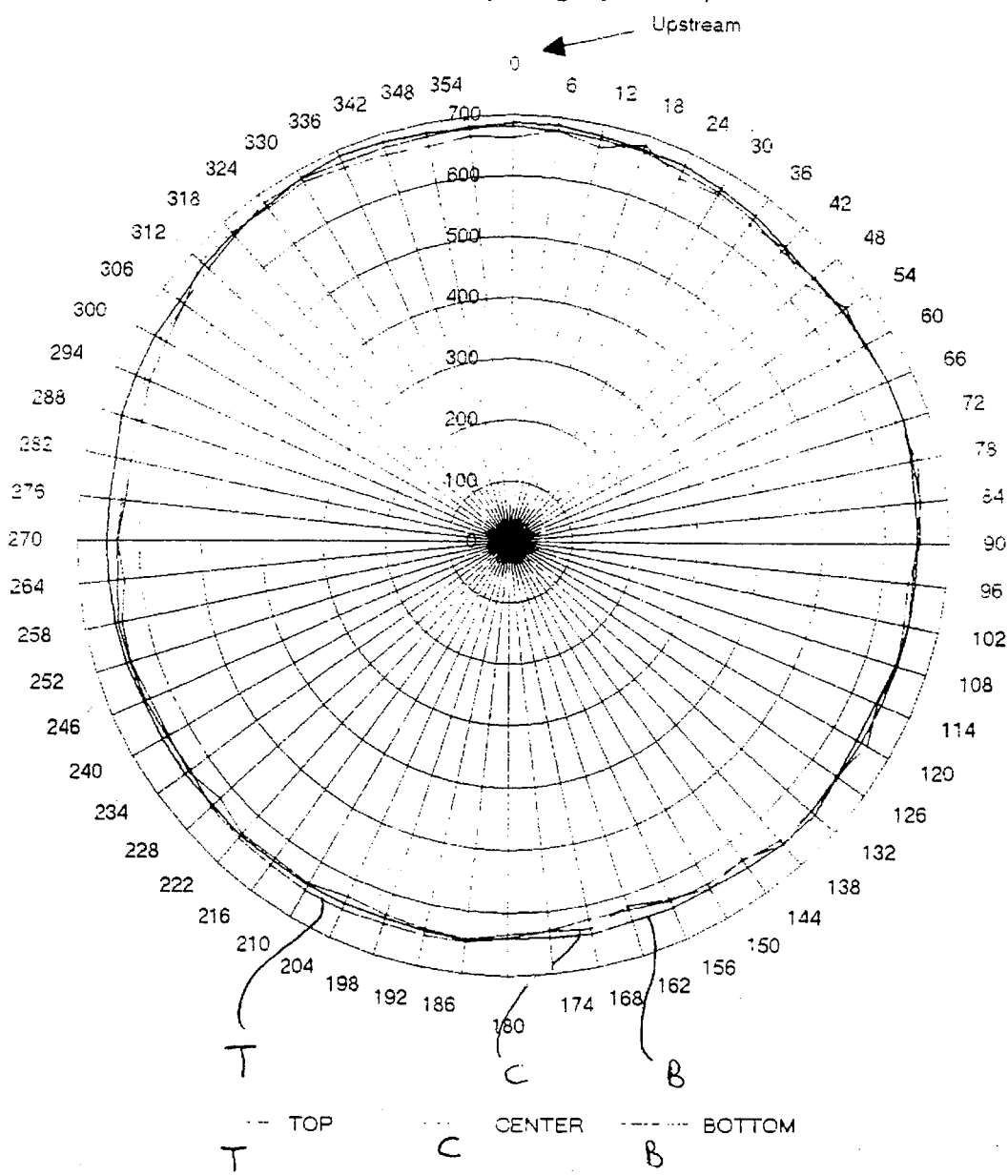

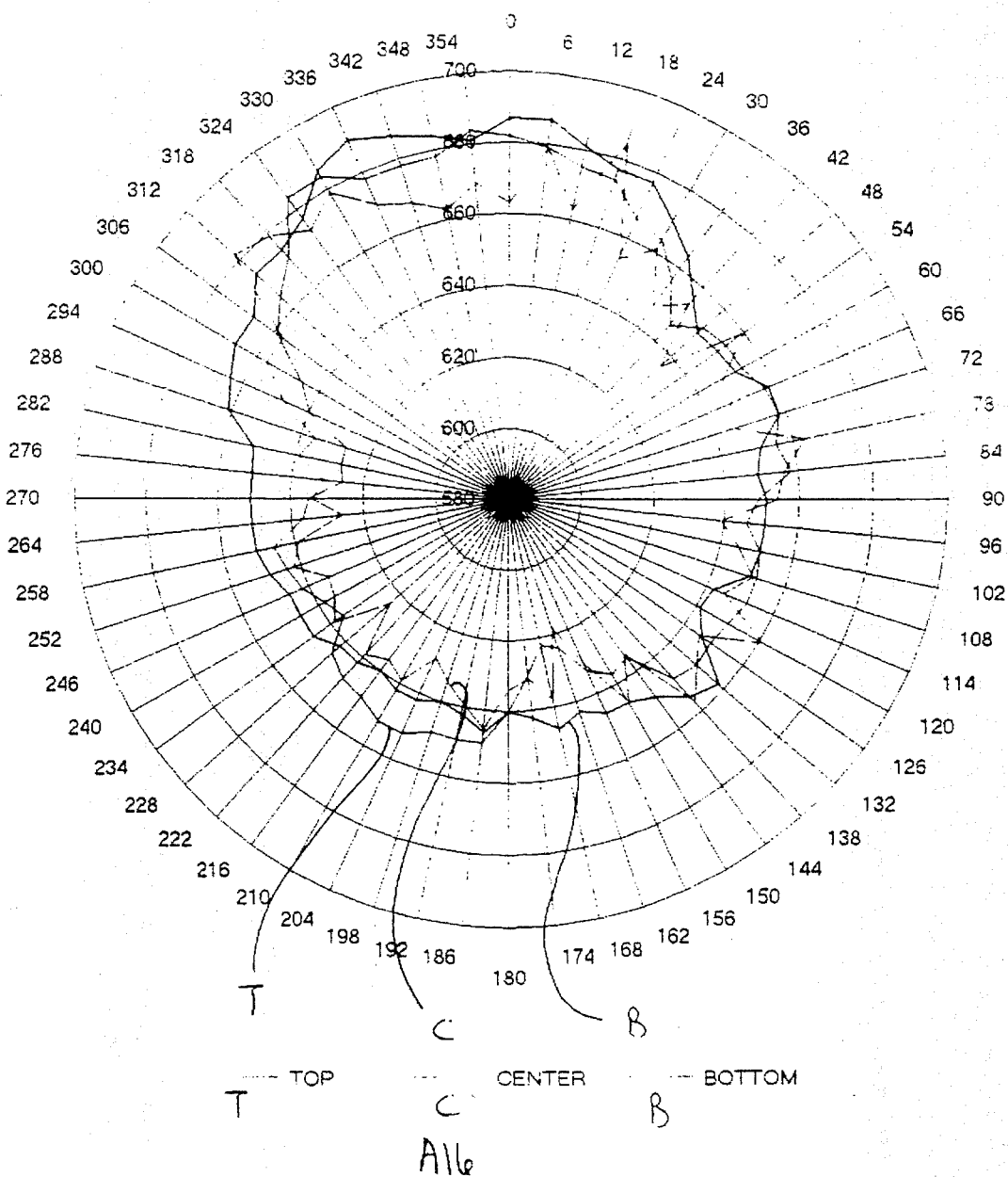

DRAFT TUBE SECTION

THIS SECTION SHOWS A PROFILE OF THE DRAFT TUBE., THIS IS DONE BY MOUNTING A METAL BAR VERTICALLY ON A TURBINE BLADE , THE BAR IS MOUNTED APPROXIMATEALY .5 INCHS FROM THE SURFACE OF THE DRAFT TUBE IN LINE WITH POLE #2 ON THE ROTOR. THE AIRGAP TRANSDUCERS ARE THEN MOUNTED ON THIS STEEL BAR FACING THE DRAFT TUBE SURFACE AND THE GENERATOR IS ROTATED 360 deg, FOR CONVENIENCE SAKE ONLY THE READINGS WHICH CORRESPOND WITH THE MINIMUM ROTOR POLE READINGS ARE PLOTTED. THE PLOT OF THE DRAFT TUBE IS SHOWN IN DEGREES WITH 0 deg BEING DIRECTLY UPSTREAM . IT SHOULD BE NOTED THAT THE CENTER OF THE PLOT IS NOT RELATED TO THE CENTER OF THE DRAFT TUBE, THE PLOT ONLY SHOWS THE VARIATIONS WITH RESPECT TO THE CIRCUMFERENCE OF THE DISCHARGE RING.

DRAFT TUBE TABLE 1 (DT-1)

COLUMN ONE     LISTS THE DEGREES CLOCKWISE FROM UPSTREAM LOOKING DOWN ON THE DFAFT TUBE

COLUMN TWO     LISTS THE MINIMUM AIRGAP FOR THAT POSITION

"BEST CENTRE" IN SHOWN ON THE TOP RIGHT HAND SIDE

DRAFT TUBE CHARTS 1 & 2 (DC-1 & DC-2)

THESE PLOTS REPRESENT A PROFILE OF THE DRAFT TUBE NEAR THE TOP WERE IT WAS MACHINED THE SCALE OF CHART 1 IS 600 MILS AND THE SCALE OF CHART TWO IS 150 MILS.

*THIS LINE IS 100 MILS HIGH  >  |*

A17

CG Draft Tube
Mar-94
0 Deg Losteam

| Degrees | DT Value |
|---|---|
| 0 | 545 |
| 6 | 546 |
| 12 | 550 |
| 18 | 548 |
| 24 | 553 |
| 30 | 553 |
| 36 | 552 |
| 42 | 547 |
| 48 | 544 |
| 54 | 539 |
| 60 | 534 |
| 66 | 530 |
| 72 | 527 |
| 78 | 521 |
| 84 | 515 |
| 90 | 509 |
| 96 | 499 |
| 102 | 492 |
| 108 | 488 |
| 114 | 479 |
| 120 | 473 |
| 126 | 469 |
| 132 | 460 |
| 138 | 456 |
| 144 | 456 |
| 150 | 450 |
| 156 | 449 |
| 162 | 446 |
| 168 | 444 |
| 174 | 443 |
| 180 | 442 |
| 186 | 437 |
| 192 | 438 |
| 198 | 439 |
| 204 | 442 |
| 210 | 440 |
| 216 | 444 |
| 222 | 447 |
| 228 | 448 |
| 234 | 453 |
| 240 | 456 |
| 246 | 460 |
| 252 | 465 |
| 258 | 469 |
| 264 | 477 |
| 270 | 481 |
| 276 | 485 |
| 282 | 491 |
| 288 | 496 |
| 294 | 501 |
| 300 | 504 |
| 306 | 510 |
| 312 | 515 |
| 318 | 521 |
| 324 | 527 |
| 330 | 531 |
| 336 | 533 |
| 342 | 538 |
| 348 | 542 |
| 354 | 544 |

Draft Tube Best Center

Degrees = 18

Distance = 55.9

A18

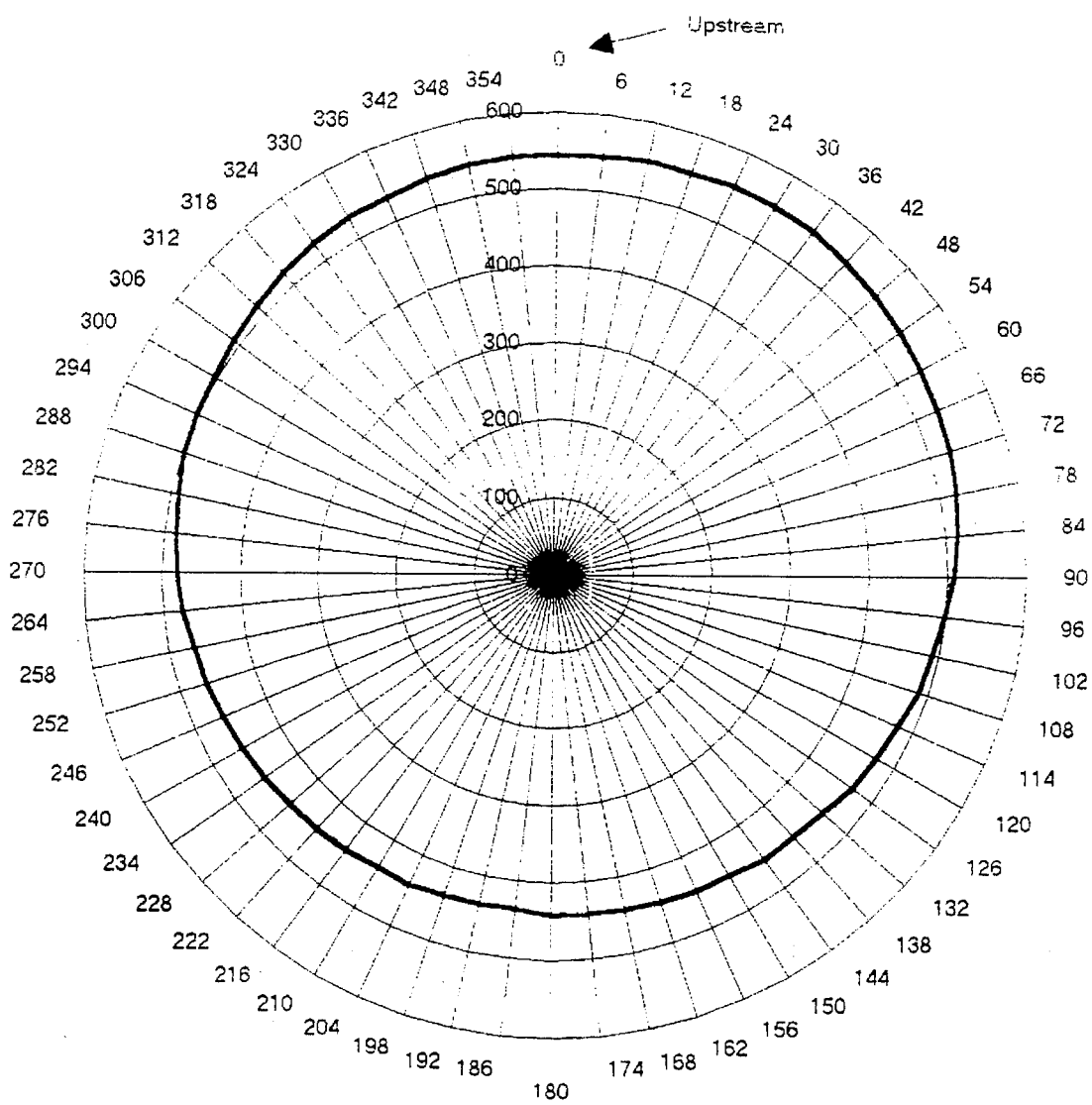

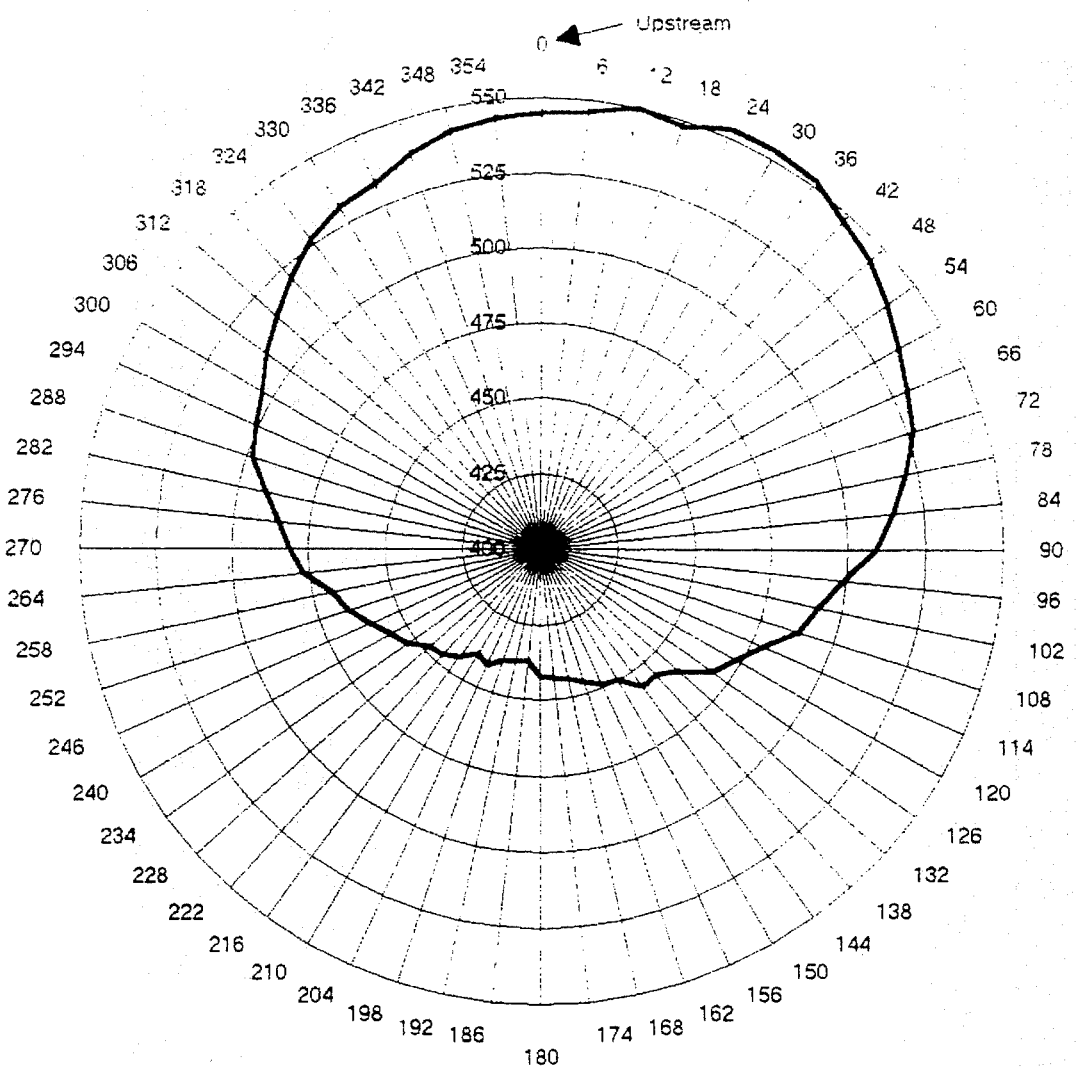
CG Draft Tube March 1994 (0 Deg Upstream)
A20

We claim:

1. A method of determining the best position for an inner member relative to an outer member within a rotary machine comprising the steps of:
   (a) rotating the inner and outer members relative to one another through at least one revolution;
   (b) obtaining a series of measurements through said at least one revolution representing the spacing between at least one location on said inner member and a plurality of angularly spaced locations on said outer member;
   (c) obtaining a series of measurements through said at least one revolution representing the spacing between at least one location on said outer member and a plurality of angularly spaced locations on said inner member;
   (d) processing said measurements between said at least one location on said inner member and said plurality of angularly spaced locations on said outer member to determine a best center for said outer member; and
   (e) processing said obtained measurements between said at least one location on said outer member and said plurality of angularly spaced locations on said inner member to determine a best center for said inner member, said best position for one of said inner and outer members relative to the other of said inner and outer members comprising a position wherein said best center for said inner member intersects said best center for said outer member.

2. The method of claim 1 wherein at step (b) said obtained series of measurements represent the spacing between each of two or more locations spaced along the length of said inner member and said plurality of angularly spaced locations on said outer member.

3. The method of claim 1 wherein at step (c) said obtained series of measurements represent the spacing between each of two or more locations spaced along the length of said outer member and said plurality of angularly spaced locations on said inner member.

4. The method of claim 2 wherein at step (c) said obtained series of measurements represent the spacing between each of two or more locations spaced along the length of said outer member and said plurality of angularly spaced locations on said inner member.

5. The method of claim 4 wherein said two or more locations spaced along the length of each of said inner and outer members are near the ends and middle of said inner and outer members respectively.

6. The method of claim 1 further comprising the step of generating a visual representation of said best position for said inner member relative to said outer member.

7. The method of claim 6 wherein said visual representation is a plot.

8. The method of claim 1 wherein at step (b) and step (c) said obtained series of measurements representing the spacing between said inner and outer member and said obtained series of measurements representing the spacing between said outer and inner member are obtained from at least one capacitive sensor on each of said inner and outer members.

9. The method of claim 8 wherein said at least one capacitive sensor on said inner member and an adjacent section of said outer member form a parallel plate capacitor with the spacing therebetween constituting the dielectric of said capacitor, said at least one capacitive sensor generating an output signal from which spacing measurements are obtained, said signal varying as a function of the spacing between said at least one capacitive sensor and said adjacent section of said outer member and wherein said at least one capacitive sensor on said outer member and an adjacent section of said inner member form a parallel plate capacitor with the spacing therebetween constituting the dielectric of said capacitor, said at least one capacitive sensor generating an output signal from which spacing measurements are obtained, said signal varying as a function of the spacing between said sensor and said adjacent section of said inner member.

10. The method of claim 9 further comprising the step of generating from said obtained series of measurements from the output signal of said at least one capacitive sensor on said inner member, a profile of said outer member and generating from said obtained series of measurements from the output signal of said at least one capacitive sensor on said outer member, a profile of said inner member.

11. The method of claim 9 wherein said inner member rotates and said outer member is stationary and said at least one capacitive sensors on said inner member are electrically connected to a processing unit by at least one cable, said method further comprising the step of winding the at least one cable about said inner member in a direction opposite the rotation thereof in step (a) so that said at least one cable unwinds as said inner member rotates in step (a).

12. The method of claim 1 wherein at step (b) and step(c) said obtained series of measurements which represent the spacing between said inner and outer members is obtained over at least two revolutions.

13. The method of claim 9 wherein at step (a), the inner and outer members are rotated at a selected, generally constant velocity and wherein at step (b) and step (c) the output signals of each of said at least one capacitive sensors are sampled at a sampling rate selected in accordance with said selected velocity.

14. An apparatus for determining the best position for an inner member relative to an outer member within a rotary machine, said apparatus comprising:
   at least one sensor mounted to said inner member to detect the spacing between said inner member and a plurality of angularly spaced locations on said outer member;
   at least one sensor mounted to said outer member to detect the spacing between said outer member and a plurality of angularly spaced locations on said inner member; and
   a processor to process said detected spacings and determine therefrom a best position for said inner member relative to said outer member.

15. An apparatus as defined in claim 14 wherein three sensors are located along the length of the inner member at spaced locations.

16. An apparatus as defined in claim 14 wherein three sensors are located along the length of the outer member at spaced locations.

17. An apparatus as defined in claim 16 wherein said sensors are located near the ends and middle of said outer member.

18. An apparatus as defined in claim 14 further comprising output means in communication with said processing means to generate a physical representation of the best position for said inner member relative to said outer member.

19. An apparatus as defined in claim 14 wherein said sensors are in the form of capacitive sensors.

20. An apparatus as defined in claim 19 wherein the at least one capacitive sensor on the inner member and an adjacent section of said outer member form a parallel plate capacitor with the spacing therebetween constituting the dielectric of said capacitor, said capacitive sensor generating an output signal from which detected spacings are obtained, said signal varying as a function of the spacing between said at least one sensor and said adjacent section of said outer member and wherein the at least one capacitive sensor on the outer member and an adjacent section of said inner member form a parallel plate capacitor with the spacing therebetween constituting the dielectric of said capacitor, said capacitive sensor generating an output signal from which detected spacings are obtained, said signal varying as a function of the spacing between said at least one sensor and said adjacent section of said inner member.

21. An apparatus as defined in claim 20 wherein said processor generates from said detected spacings obtained from said at least one sensor on said inner member, a profile of said outer member and generates from said detected spacings obtained from said at least one sensor on said outer member, a profile of said inner member.

22. An apparatus as defined in claim 21 wherein said inner member rotates and said outer member is stationary and wherein said at least one sensor one said inner member is electrically connected to said processor by at least one cable, said at least one cable being wound about said inner member in a direction opposite the rotation thereof so that said at least one cable unwinds as said inner member rotates.

23. An apparatus as defined in claim 22 wherein said processor samples the output of each of said at least one sensors at a sampling rate selected in accordance with the velocity of rotation of said inner member.

24. An apparatus as defined in claim 14 wherein at least one of said at least one sensor mounted to said inner member and said at least one sensor mounted to said outer member is removably attached thereto.

25. An apparatus as defined in claim 24 wherein said at least one of said at least one sensor mounted to said inner member and said at least one sensor mounted to said outer member is magnetically attached.

26. An apparatus as defined in claim 15 wherein said sensors are located near the ends and middle of said inner member.

* * * * *

UNITED STATES PATENT AND TRADEMARK OFFICE
CERTIFICATE OF CORRECTION

PATENT NO.   : 5,513,539
DATED        : May 7, 1996
INVENTOR(S)  : McLAUGHLIN ET AL

It is certified that error appears in the above-indentified patent and that said Letters Patent is hereby corrected as shown below:

In Column 9, line 19, after "208)" please insert -- , wherein the best center determined for the rotor intersects the best center determined for the stator, --.

In column 9, line 20, please delete [, wherein the best center determined for the rotor intersects the best center determined for the stator].

Signed and Sealed this

Twenty-seventh Day of May, 1997

Attest:

BRUCE LEHMAN

Attesting Officer        Commissioner of Patents and Trademarks